United States Patent [19]
Naito et al.

[11] Patent Number: 4,598,729
[45] Date of Patent: Jul. 8, 1986

[54] NEGATIVE PRESSURE CONTROL VALVE

[75] Inventors: Mitikatu Naito, Nagoya; Kiyotosi Yano; Kazuo Itou, both of Kariya; Kunihiro Tsuzuki, Oobu; Masaaki Tanaka; Michio Kawagoe, both of Susono, all of Japan

[73] Assignees: Nippondenso Co., Ltd., Kariya; Toyota Jidosha Kogyo Kabushiki Kaisha, Toyota, both of Japan

[21] Appl. No.: 388,659

[22] Filed: Jun. 15, 1982

[30] Foreign Application Priority Data

| Jun. 19, 1981 | [JP] | Japan | 56-94609 |
| Aug. 10, 1981 | [JP] | Japan | 56-118609[U] |
| Sep. 28, 1981 | [JP] | Japan | 56-143651[U] |
| Oct. 26, 1981 | [JP] | Japan | 56-159416[U] |
| Oct. 26, 1981 | [JP] | Japan | 56-159417[U] |

[51] Int. Cl.⁴ ............................................ G05D 16/06
[52] U.S. Cl. .................................. 137/116.5; 123/571; 137/85; 137/596.17; 137/627.5; 137/907
[58] Field of Search ............... 123/571; 137/85, 116.5, 137/627.5, DIG. 8, 596.17

[56] References Cited

U.S. PATENT DOCUMENTS

| 3,071,147 | 1/1963 | Dudzinski | 137/116.5 |
| 3,545,472 | 12/1970 | Franz | 137/116.5 |
| 3,590,849 | 7/1971 | Austin | 137/116.5 |
| 3,921,666 | 11/1975 | Leiber | 137/596.17 X |
| 4,079,753 | 3/1978 | Popp | 137/627.5 |
| 4,120,214 | 10/1978 | Toda | 123/571 X |
| 4,166,476 | 9/1979 | Yamanaka | 137/627.5 X |

Primary Examiner—Robert G. Nilson
Attorney, Agent, or Firm—Cushman, Darby & Cushman

[57] ABSTRACT

A negative pressure control valve for generating a negative pressure has an inlet port communicating with a negative pressure source, an outlet port communicating with a negative pressure load, a diaphragm chamber with one surface defined by a diaphragm, and an atmospheric pressure chamber adjacent to the diaphragm chamber through the diaphragm and communicating with atmospheric pressure. The diaphragm holds a valve holding member. A solenoid operated mechanism which moves the valve holding member to a first or second position in accordance with an exciting current is disposed in the atmospheric pressure chamber. The valve holding member has a valve mechanism which communicates the diaphragm chamber with the atmospheric pressure chamber at the first position and seals a channel between those chambers at the second position. The solenoid operated mechanism selectively communicates the diaphragm chamber with the atmospheric pressure chamber.

1 Claim, 14 Drawing Figures

NEGATIVE PRESSURE CONTROL VALVE

BACKGROUND OF THE INVENTION

The present invention relates to a negative pressure control valve for controlling the opening and closing operation of an exhaust gas control valve arranged in an EGR (exhaust gas return) channel communicating an exhaust system with an inlet system of a diesel engine or the like.

Various measures must be taken to treat exhaust gases from a diesel engine mounted on a vehicle as a power source. For instance, it is proposed to form an EGR channel communicating the exhaust system with the inlet system of a diesel engine and to open or close the EGR channel with an EGR valve. The EGR valve is controlled according to the load conditions of the engine.

However, unlike a gasoline engine, the diesel engine does not have a negative pressure source which varies the negative pressure output according to the loading conditions. For this reason, a negative pressure control valve which varies the negative pressure according to the loading conditions must be incorporated so as to control the EGR valve in a diesel engine. Thus, the opening and closing operation of the EGR valve is controlled according to the magnitude of the negative pressure regulated by the negative pressure control valve.

SUMMARY OF THE INVENTION

It is an object of the present invention to provide a negative pressure control valve which produces a negative pressure in accordance with the operating conditions and loading conditions of a diesel engine or the like and which is capable of controlling the operating conditions of an exhaust gas control valve (EGR valve) in an EGR channel communicating an exhaust system with an inlet system.

A negative pressure control valve, according to the present invention, has a diaphragm chamber which, in turn, has an inlet port connected to a negative pressure source and also has an outlet port connected to a negative pressure load. The diaphragm chamber is partially defined by a diaphragm, next to which is formed an atmospheric pressure chamber connected to atmospheric pressure. The diaphragm holds a valve holding member which has a channel communicating the diaphragm chamber with the atmospheric pressure chamber. A valve mechanism is disposed in this channel, which is opened when the valve holding member is located at the side of the diaphragm chamber and which is closed when the valve holding member is located at the side of the atmospheric pressure chamber. The valve holding mechanism is constructed so that the valve mechanism is moved to its open or closed position by a solenoid operated mechanism which is excited by a loading condition detection signal or the like.

It is another object of the present invention to provide a negative pressure control valve wherein the movement of the valve holding member is controlled with good response characteristics by the solenoid operated mechanism through control of an exciting current.

It is still another object of the present invention to provide a negative pressure control valve wherein the structure of the solenoid operated mechanism is simplified while control of the movement of the valve holding member is performed with excellent precision.

DESCRIPTION OF THE PREFERRED EMBODIMENTS

Figure 1:
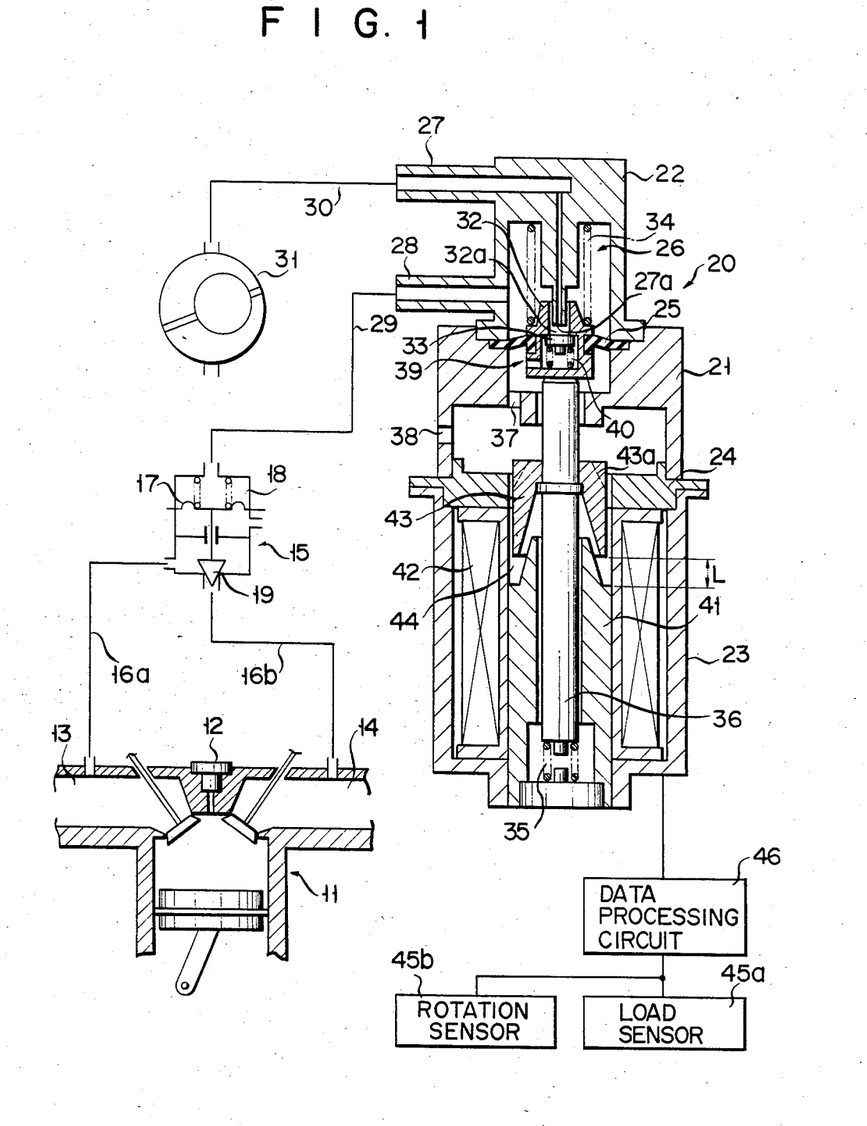
FIG. 1 is a sectional view of a negative pressure control valve according to an embodiment of the present invention, which also shows the configuration of associated parts.

FIG. 1 is a sectional view of a negative pressure control valve 20 according to an embodiment of the present invention, which is used for EGR control of a diesel engine 11.

The diesel engine 11 has a fuel injection nozzle 12 for supplying fuel into a cylinder which communicates with an exhaust system 13 and an inlet system 14. The exhaust system 13 and the inlet system 14 communicate with each other through an exhaust gas control valve 15. The exhaust system 13 and the exhaust gas control valve 15 are connected by an EGR channel 16a while the exhaust gas control valve 15 and the inlet system 14 are connected by another EGR channel 16b.

The exhaust gas control valve 15 has a diaphragm chamber 18 partially defined by a diaphragm 17 which drives a valve plug 19 to open or close the EGR channel 16b in accordance with the negative pressure in the diaphragm chamber 18 thereby performing EGR control of the diesel engine 11. The negative pressure in the diaphragm chamber 18 of the exhaust gas control valve 15 is controlled by the negative pressure control valve 20.

The outer wall of the negative pressure control valve 20 is defined by a housing 21, a cover 22, a yoke 23, and a magnetic plate 24. Another diaphragm 25 is clamped between the housing 21 and the cover 22 to form two chambers corresponding to the housing 21 and to the cover 22. More specifically, the diaphragm 25 and the cover 22 define a diaphragm chamber 26 which has a negative pressure inlet port 27 and a negative pressure outlet port 28. The diaphragm 25 and the housing 21 define an atmospheric pressure chamber 39 to be described later. The negative pressure outlet port 28 is connected to the diaphragm chamber 18 of the exhaust gas control valve 15 described above through a channel 29. The interior of the diaphragm chamber 26 is evacuated through the negative pressure inlet port 27 by a vacuum pump 31 as a negative pressure source connected thereto through a channel 30.

The diaphragm 25 has at its center a valve holding member 32 which, in turn, has a valve plug 33. The valve holding member 32 is biased in a direction so as to force open the diaphragm chamber 26 by a first spring 34 disposed in the diaphragm chamber 26. The valve holding member 32 is also supported by a moving rod 36 which is biased by a second spring 35 to counteract the first spring 34.

The atmospheric pressure chamber 39 defined by the diaphragm 25 and the housing 21 is exposed to ambient air through openings 37 and 38 in the housing 21.

A channel 32a communicating the diaphragm chamber 26 with the atmospheric pressure chamber 39 is formed in the valve holding member 32. The valve plug 33 is urged against a valve seat arranged in this channel 32a by a third spring 40 so as to close the channel 32a. As may be seen from the drawing, the first to third springs 34, 35 and 40 comprise compression springs. The biasing force of the third spring 40 acts in the direction toward the diaphragm chamber 26 thereby causing valve plug 33 to close the channel 32a. One end 27a of the negative inlet port 27 extends to a position of the channel 32a of the valve holding member 32 corresponding to the valve plug 33.

The valve holding member 32 is driven in accordance with the force balance between the first and second springs 34 and 35. This balance changes according to the negative pressure in the diaphragm chamber 26. For example, when the negative pressure in the diaphragm chamber 26 is smaller than a predetermined value, the pressure difference between the diaphragm chamber 26 and the breather chamber 39 is small. As shown in the figure, the valve holding member 32 is pressed downward by the first spring 34, and the valve plug 33 is urged against the valve seat in the channel 32a by the third spring 40. Thus, communication between the diaphragm chamber 26 and the atmospheric pressure chamber 39 is blocked. In this state, the interior of the diaphragm chamber 26 is evacuated by the vacuum pump 31 through the negative pressure inlet port 27 thereby increasing the negative pressure therein.

As the negative pressure in the diaphragm chamber 26 increases with respect to the pressure in the atmospheric pressure chamber 39, the second spring 35 moves the valve holding member 32 upward through the moving rod 36. The end 27a of the negative inlet port 27 abuts against the valve plug 33 causing the valve plug 33 to open against the biasing force of the third spring 40. Thus, communication between the diaphragm chamber 26 and the atmospheric pressure chamber 39 is established. In this manner, the end 27a of the negative pressure inlet port 27 serves as the valve seat which opens the valve plug 33.

The moving rod 36 is arranged in the yoke 23 in alignment with its central axis. A stator core 41 is arranged around the outer surface of the moving rod 36. A coil 42 is wound around the stator core 41. A magnetic plate 24 integrally formed with the yoke 23 is arranged above the coil 42. A moving core 43 is arranged around the moving rod 36 in correspondence with the magnetic plate 24. A gap 44 is defined between the moving core 43 and the stator core 41. When an exciting current flows through the exciting coil 42, a magnetic attracting force is induced in the gap 44 which causes the moving rod 36 to move downward against the biasing force of the second spring 35.

Load and rotation detection signals from a load sensor 45a and a rotation sensor 45b are supplied to a data processing control circuit 46 such as a computer. In response to these signals, the data processing control circuit 46 controls the exciting current to be supplied to the coil 42.

In the negative pressure control valve 20 of the arrangement as described above, when the load increases, a load detection signal corresponding to the increase in the negative pressure is generated by the load sensor 45a. The load detection signal is supplied to the data processing control circuit 46. The data processing control circuit 46 reduces the exciting current supplied to the coil 42 as the load increases. The magnetic attracting force corresponding to the reduced current acts in the gap 44.

Even if the negative pressure in the diaphragm chamber 26 is relatively low when the reduced current is supplied to the coil 41, the biasing force of the first spring 34 overcomes that of the second spring 35. Therefore, the moving rod 36 moves downward (in the drawing) to lower the valve holding member 32. Then, the valve plug 33 is brought into contact with the end 27a of the negative pressure inlet port 27 to communicate the diaphragm chamber 26 with the breather chamber 39. Simultaneously, the end 27a of the negative pressure inlet port 27 is closed to keep the interior of the diaphragm chamber 26 at atmospheric pressure.

Once the pressure difference between the diaphragm chamber 26 and the atmospheric pressure chamber 39 is eliminated in this manner, the second spring 35 moves the valve holding member 32 upward against the magnetic attracting force acting in the gap 44 to reestablish the state as shown in the drawing. The diaphragm chamber 26 is evacuated by the vacuum pump 31 to establish a negative pressure therein.

In this manner, a negative pressure corresponding to the load conditions is set in the diaphragm chamber 26. The negative pressure established in the diaphragm chamber 26 controls the negative pressure in the diaphragm chamber 18 of the exhaust gas control valve 15 through the channel 29. Accordingly, EGR control of the diesel engine 11 is performed by the valve plug 19.

Figure 2:
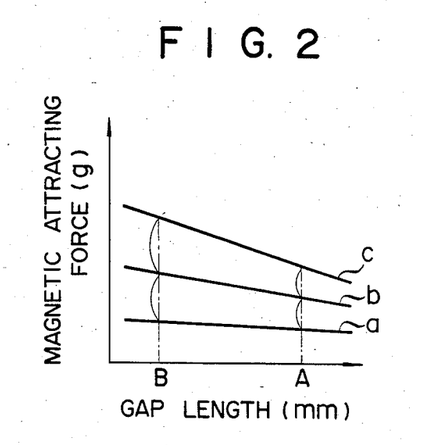
FIG. 2 is a graph showing the magnetic attracting force (g) as a function of the gap length L (mm) when the moving core of the negative pressure control valve shown in FIG. 1 is in its first position.

If the upper end of the moving core 43 which is magnetically attracted in the negative pressure control valve 20 as described above is of linear configuration as shown in FIG. 2, the magnetic attracting force acting in the gap 44 as a function of the exciting current is as shown in FIG. 2. If the gap 44 is narrow as indicated by point A on the axis of abscissa, the increase in the attracting force per unit current is greater. Referring to FIG. 2, a curve a corresponds to an exciting current of 0.1 A, a curve b corresponds to a current of 0.2 A, and a curve c corresponds to a current of 0.3 A.

Figure 3:
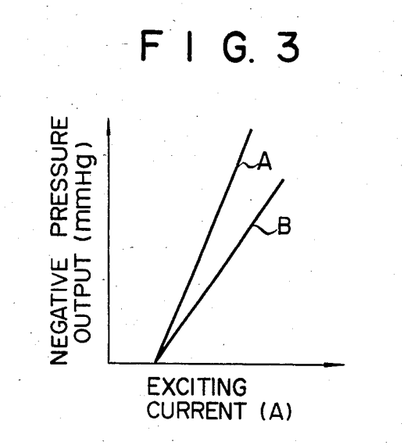
FIG. 3 is a graph showing the negative pressure output (mmHg) as a function of the exciting current (A) when the negative pressure control valve is in the same state as in FIG. 2.

Depending on whether the gap 44 has a gap length L corresponding to point A or B in FIG. 2, the negative pressure outputs from the diaphragm chamber 26 as a function of the exciting current are represented by characteristic curves A and B in FIG. 3, respectively. If the gap 44 is narrower, the negative pressure output decreases with a greater gradient as a function of the current.

If the position of the moving core 43 with respect to the stator core 41 is adjusted to set the proper gap length L of the gap 44, a desired negative pressure characteristic of the diaphragm chamber 26 as a function of the current supplied to the coil 42 may be obtained.

Figure 4:
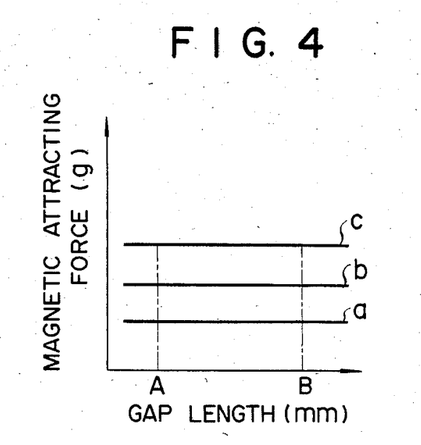
FIG. 4 is a graph showing the magnetic attracting force (g) as a function of the gap length L (mm) when the moving core of the negative pressure control valve shown in FIG. 1 is in its second position.
Figure 5:
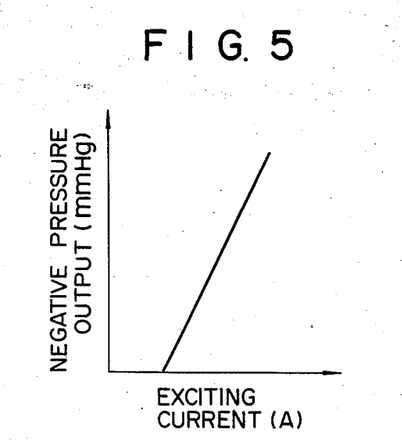
FIG. 5 is a graph showing the negative pressure output (mmHg) as a function of the exciting current (A) when the negative pressure control valve is in the same state as in FIG. 4.

If the moving core 43 is tapered to be narrower toward the upper end as indicated by dotted lines 43a in FIG. 1 to decrease the distance thereof from the magnetic plate 24, the magnetic attracting force (acting on the moving core 43) characteristic as shown in FIG. 4 is obtained. More specifically, the increase in the magnetic attracting force per unit current remains the same, irrespectively of the gap length L of the gap 44. For this reason, the negative pressure characteristic of the diaphragm chamber 26 as a function of the current becomes constant as shown in FIG. 5. Therefore, constant control characteristics may be easily obtained by the negative pressure control valve 20.

When the engine load decreases, the data processing control circuit 46 such as a computer serves to increase the exciting current to be supplied to the coil 42 upon reception of a load detection signal from the load sensor 45a. If the engine load is relatively small, a relatively high negative pressure of the diaphragm chamber 26 is supplied to the diaphragm chamber 18 of the exhaust gas control valve 15. Then, a great amount of exhaust gas is returned to the inlet system 14 for recombustion.

In the embodiment described above, the position of the valve holding member 32 is set according to the pressure difference established between the diaphragm chamber 26 and the atmospheric pressure chamber 39 as well as by the balance between the biasing forces of the first and second springs 34 and 35. However, the position of the valve holding member 32 may be set by utilizing only the pressure difference between the diaphragm chamber 26 and the atmospheric pressure chamber 39 without utilizing the first and second springs 34 and 35. In this case, the valve holding member 32 must be attracted in the direction to be separated from the diaphragm chamber 26 by the solenoid operated mechanism comprising the coil 42, the stator core 41, the moving core 43, and etc.

Figure 6:
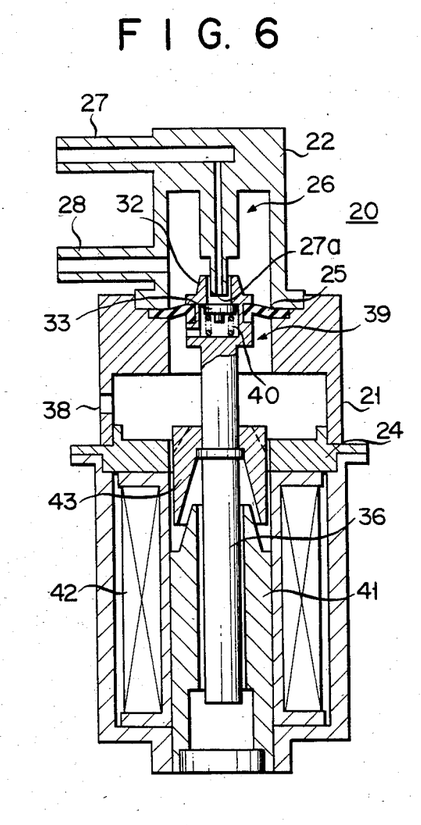
FIG. 6 is a sectional view of a negative pressure control valve according to another embodiment of the present invention which is a modification of the embodiment shown in FIG. 1.

FIG. 6 shows another embodiment of the present invention wherein the first and second springs 34 and 35 are omitted, and the moving rod 36 is formed integrally with the valve holding member 32. When an exciting current is supplied to the coil 42, the magnetic attracting force acts between the stator core 41 and the moving core 43 to move the valve holding member 32 downward overcoming the negative pressure in the diaphragm chamber 26.

In the negative pressure control valve of this second embodiment, the data processing control circuit 46 serves to decrease the exciting current to be supplied to the coil 42 as the detected load increases upon reception of the load detection signal from the load sensor 45a.

Figure 7:
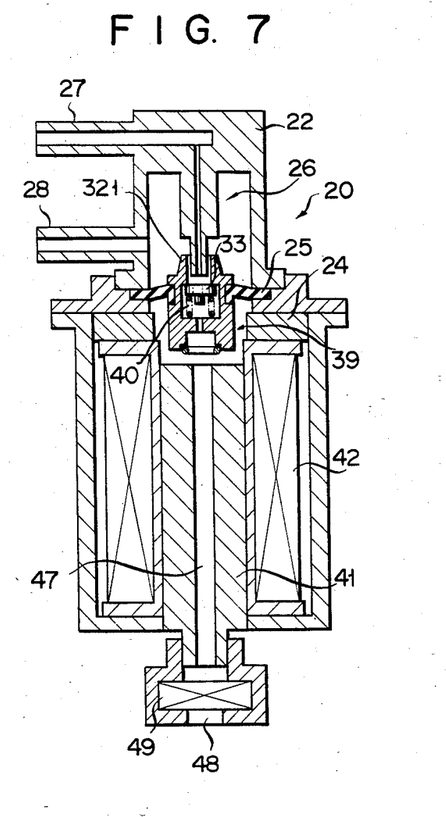
FIG. 7 is a sectional view of a negative pressure control valve according to still another embodiment of the present invention.

FIG. 7 shows a negative pressure control valve 20 according to still another embodiment of the present invention. According to this third embodiment, a valve holding member 321 comprises a magnetic substance such as iron. The breather chamber 39 communicates with the ambient air through a channel 47 formed in alignment with the central axis of the stator core 41. A filter 49 is arranged at a breather opening 48.

According to the third embodiment, when the exciting current is supplied to the coil 42, the magnetic attracting force directly acts on the valve holding member 321. This magnetic attracting force is balanced with the negative pressure in the diaphragm chamber 26.

Figure 8:
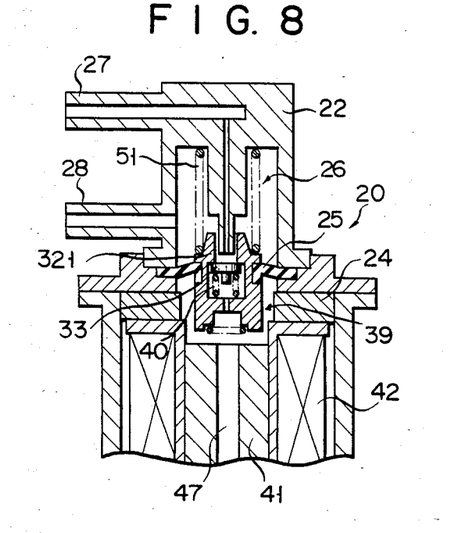
FIG. 8 is a partial sectional view of a negative pressure control valve according to still another embodiment of the present invention which is a modification of the embodiment shown in FIG. 7.

As shown in another embodiment in FIG. 8, a compression spring 51 may be interposed between the valve holding member 321 and the cover 22 to adjust the negative pressure in the diaphragm chamber 26. With this arrangement, the biasing force of the compression spring 51 is added to the magnetic attracting force acting on the valve holding member 321. Thus, the negative pressure output characteristics may be controlled by the compression spring 51. Specifically, a higher negative pressure output may be set by incorporating a compression spring 51 of a higher spring constant.

According to this fourth embodiment, a negative pressure output corresponding to the spring constant of the compression spring 51 may be obtained even when an exciting current is not supplied to the coil 42. For this reason, by selecting the spring constant of the compression spring 51, the negative pressure output during deenergized state may be freely set without any leading edge loss, as indicated by a curve a in FIG. 9A. On the other hand, when the exciting current is supplied to the coil 42, the negative pressure output includes the output during deenergized state. Therefore, a desired negative pressure output may be obtained with a current below the critical current supplied to the solenoid operated mechanism, as indicated by a curve b in FIG. 9A.

In this manner, the attracting force to be generated by the solenoid operated mechanism may be reduced so as to obtain the same negative pressure output. The exciting current to be supplied to the coil 42 may be reduced, facilitating a more compact and lighter structure.

When the coil 42 is in the nonconductive state, the spring constant of the compression spring 51 is balanced with the force of the diaphragm 25 which depends upon the magnitude of the negative pressure in the diaphragm chamber 26. Accordingly, requirements for the size tolerance during designing, processing precision during manufacture, special care during assembly and etc. may be moderated. The leading edge of the negative pressure output may be obtained without loss from a small current immediately after energization.

Figure 9A:
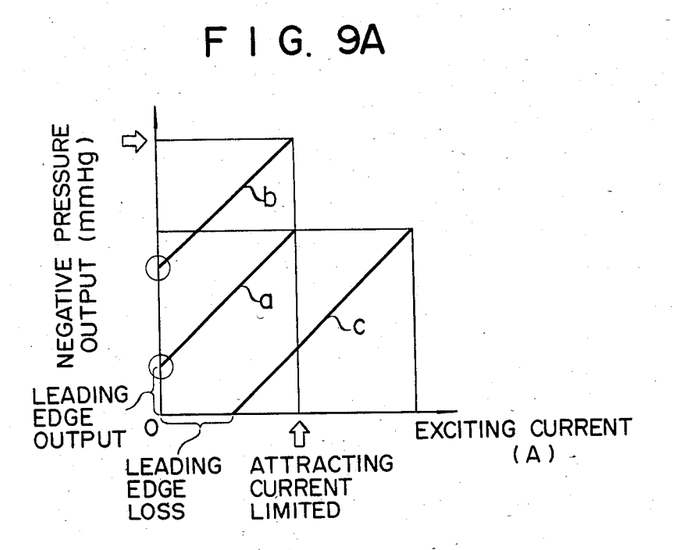
FIGS. 9A and 9B are graphs showing the negative pressure output (mmHg) as a function of the exciting current (A) in the negative pressure control valve shown in FIG. 8.

A curve c in FIG. 9A shows a case where the compression spring 51 is not used and the leading edge loss is present.

In the fourth embodiment, the compression spring 51 is interposed between the valve holding member 321 and the cover 22, which biases the valve holding member 321 in the same direction as the magnetic attracting force of the solenoid operated mechanism. Alternatively, a compression spring 52 may be interposed between the valve holding member 321 and the stator core 41, as shown in FIG. 10.

Figure 9B:
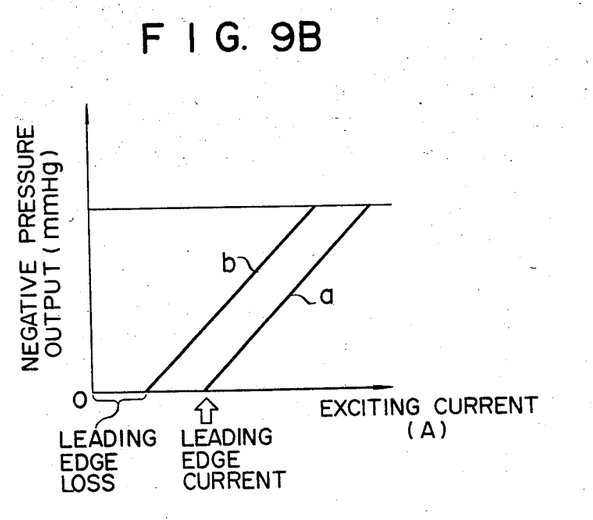
Figure 10:
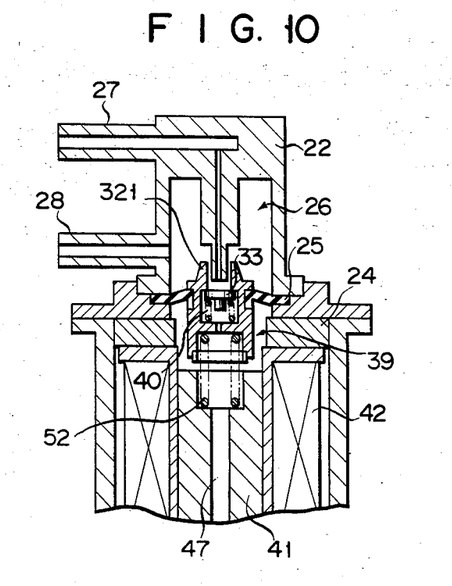
FIG. 10 is a partial sectional view of a negative pressure control valve according to still another embodiment of the present invention which is associated with that shown in FIG. 8.

According to the fifth embodiment shown in FIG. 10, even when the exciting current is supplied to the coil 42 to induce the magnetic attracting force, this magnetic attracting force is consumed to counteract the biasing force of the spring 52 and does not serve to attract the diaphragm 25 through the valve holding member 321. Since the negative pressure output is not obtained during this period, the negative pressure begins to be outputted with a current greater than the negative pressure output start current corresponding to the case wherein the compression spring 52 is absent, as indicated by a curve a in FIG. 9B. In this manner, the negative pressure output may be started from any desired current by selecting the spring constant of the compression spring 52. A curve b in FIG. 9B indicates the case wherein the compression spring 52 is absent.

In actual EGR control of a diesel engine, the negative pressure must be increased to return a larger amount of exhaust gas to the inlet system as the load decreases. Therefore, a solenoid operated negative pressure control valve which attracts the valve holding member has characteristics wherein the negative pressure output increases with the increase in the exciting current. Then, the detected load may not be kept proportional to the exciting current, and the control operation of the exciting current becomes complex in procedure.

Figure 11:
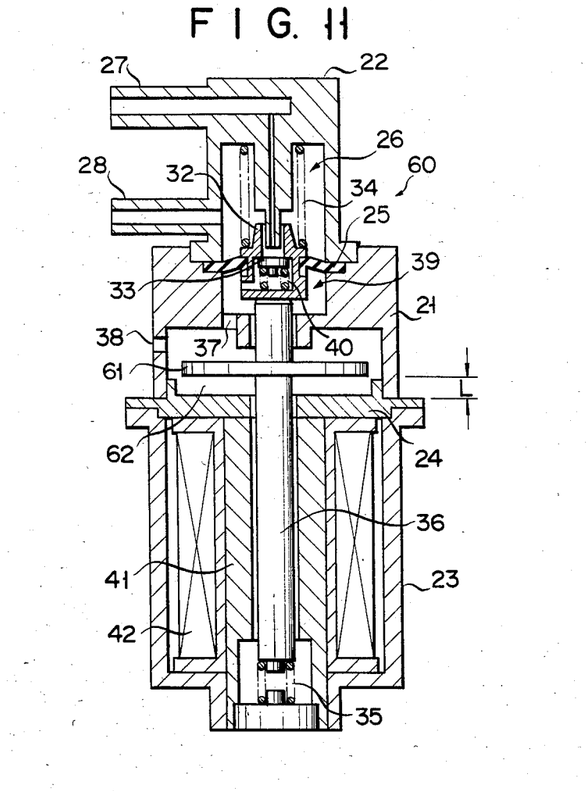
FIG. 11 is a sectional view of a negative pressure control valve according to still another embodiment of the present invention.

FIG. 11 shows a configuration of a negative pressure control valve 60 according to the sixth embodiment of the present invention, wherein the negative pressure output is reduced as the exciting current increases. The detected load is therefore kept proportional to the exciting current. The outer wall of the negative pressure control valve 60 is defined by the housing 21, the cover 22, the yoke 23 and the magnetic plate 24, as in the case of the negative pressure control valve 20 shown in FIG. 1. The diaphragm 25 is clamped between the housing 21 and the cover 22. The diaphragm 25 forms two chambers respectively corresponding to the housing 21 and the cover 22.

The diaphragm chamber 26 is defined by the diaphragm 25 and the cover 22, and has the negative pressure inlet port 27 and the negative pressure outlet port 28.

The atmospheric pressure chamber 39 is defined by the diaphragm 25 and the housing 21, and communicates with ambient air through the through holes 37 and 38.

The diaphragm 25 separating the diaphragm chamber 26 and the atmospheric pressure chamber 39 holds, at the center thereof, the valve holding member 32. The first spring 34 comprising a compression spring for urging the valve holding member 32 toward the atmospheric pressure chamber 39 is disposed in the diaphragm chamber 26. The moving rod 36 is disposed in the atmospheric pressure chamber 39 so as to support the valve holding member 32 against the biasing force of the first spring 34. The moving rod 36 is arranged in alignment with the central axis of the yoke 23 which extends coaxially with the direction of alignment of the diaphragm chamber 26 and the atmospheric pressure chamber 39. The moving rod 36 is supported through the second spring 35 comprising a compression spring by a plug which is set at the bottom part of the yoke 23. In this case, the stator core 41 is disposed at the center of the yoke 23. The magnetic plate 24 is interposed between the yoke 23 and the housing 21. The moving rod 36 is inserted into central holes formed in the central axis parts of the stator core 41 and the magnetic plate 24 so as to be slidable in the axial direction.

The moving rod 36 has an integrally formed permanent magnetic plate 61. The permanent magnetic plate 61 opposes the magnetic plate 24 with a gap 62 therebetween.

The polarity of the permanent magnetic plate 61 is set so that the repulsion force counteracts the magnetic attracting force generated by the exciting current supplied to the coil 42. Then, the force to move the moving rod 36 upward is increased in correspondence with the exciting current.

When the load increases in the negative pressure control valve 60 of the arrangement described above, the exciting current to be supplied to the coil 42 is increased, and the magnetic repulsion force acting between the magnetic plate 24 and the permanent magnetic plate 61 is increased.

The position of the valve holding member 32 is determined by the balance of the negative pressure in the diaphragm chamber 26 with the magnetic repulsion force acting on the first and second springs 34 and 35 and the permanent magnetic plate 61. When the exciting current is controlled in accordance with the detected load, the negative pressure in the diaphragm chamber 26 decreases with the increase in the load and increases with the decrease in the load. In this manner, EGR control is automatically performed wherein the amount of the exhaust gas returned to the inlet system in a diesel engine is increased.

Figure 12:
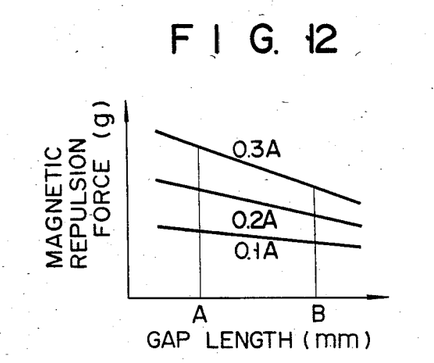
FIG. 12 is a graph showing the magnetic repulsion force (g) as a function of the gap length L (mm) in the negative pressure valve shown in FIG. 11.
Figure 13:
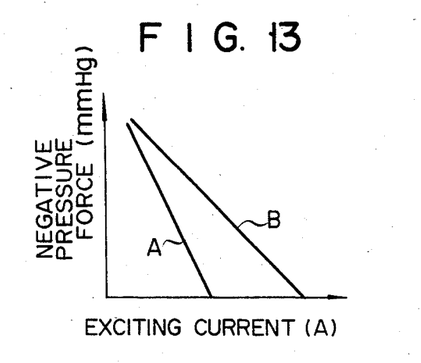
FIG. 13 is a graph showing the negative pressure output (mmHg) as a function of the exciting current (A) in the negative pressure control valve shown in FIG. 11.

The relation between the magnetic repulsion force acting on the permanent magnetic plate 61 and the exciting current will now be considered. The magnetic repulsion force and the gap length L hold the relation as shown in FIG. 12 when the exciting current is 0.1, 0.2 and 0.3 A, respectively. If the gap length L is small as indicated by point A, the increase in the repulsion force per unit current is great. Thus, the negative pressure as a function of the increase in the exciting current has a gradient as indicated by a curve A in FIG. 13.

In contrast to this, if the gap length L is wider as indicated by point B in FIG. 12, the increase in the repulsion force per unit current is small. Therefore, the negative pressure in the diaphragm chamber 26 has a small gradient as indicated by a curve B in FIG. 13.

When the opposing area of the permanent magnetic plate 61 with the magnetic plate 24 is made smaller, the magnetic repulsion force as a function of the exciting current changes in the same manner as that obtainable when the gap length L is increased. Accordingly, the change in characteristics of the negative pressure in the diaphragm chamber 26, or the gradient of the characteristic curves shown in FIG. 13 may arbitrarily be set by selectively setting the position of the permanent magnetic plate 61 or the opposing area thereof with the magnetic plate 24.

What we claim is:

1. A negative pressure control valve for controlling a negative pressure, comprising:
   a. a diaphragm chamber in which the negative pressure is set, one surface of said diaphragm chamber being defined by a diaphragm, said diaphragm chamber having an inlet port communicating with a negative pressure port and an outlet port communicating with a negative pressure load;

b. an atmospheric pressure chamber set at atmospheric pressure and disposed adjacent to said diaphragm chamber through said diaphragm;

c. a valve holding member made of a magnetic material held by said diaphragm and having a valve mechanism for selectively communicating said diaphragm chamber with said atmospheric pressure chamber; and d. a solenoid operated mechanism for controlling said valve holding member by attracting said magnetic material in response to an exciting current so as to counteract the negative pressure in said diaphragm chamber.

* * * * *